(12) United States Patent
Dudai et al.

(10) Patent No.: US 9,116,808 B2
(45) Date of Patent: Aug. 25, 2015

(54) METHOD AND SYSTEM FOR DETERMINING DEVICE CONFIGURATION SETTINGS

(71) Applicant: VONAGE NETWORK LLC, Holmdel, NJ (US)

(72) Inventors: Sagi Dudai, Tel-Aviv (IL); Guy Bar On, Tel-Aviv (IL); Dany Orr, Tel-Aviv (IL); Gil Osher, Tel-Aviv (IL)

(73) Assignee: VONAGE NETWORK LLC, Holmdel, NJ (US)

( * ) Notice: Subject to any disclaimer, the term of this patent is extended or adjusted under 35 U.S.C. 154(b) by 144 days.

(21) Appl. No.: 13/839,593

(22) Filed: Mar. 15, 2013

(65) Prior Publication Data

US 2014/0281664 A1  Sep. 18, 2014

(51) Int. Cl.
*G06F 11/00* (2006.01)
*G06F 11/07* (2006.01)
*H04L 29/08* (2006.01)
*G06F 9/445* (2006.01)

(52) U.S. Cl.
CPC ........ *G06F 11/0793* (2013.01); *G06F 9/44505* (2013.01); *G06F 11/0742* (2013.01); *G06F 11/0748* (2013.01); *G06F 11/0778* (2013.01); *H04L 67/306* (2013.01)

(58) Field of Classification Search
USPC ................................. 714/3, 4.1, 10
See application file for complete search history.

(56) References Cited

U.S. PATENT DOCUMENTS

| | | | |
|---|---|---|---|
| 2009/0044056 A1* | 2/2009 | Itoh ................................. | 714/31 |
| 2013/0297759 A1* | 11/2013 | Staats et al. .................... | 709/223 |
| 2013/0316746 A1* | 11/2013 | Miller et al. ................... | 455/466 |
| 2013/0346956 A1* | 12/2013 | Green et al. .................... | 717/168 |
| 2014/0143605 A1* | 5/2014 | Balla et al. .................... | 714/38.1 |

* cited by examiner

*Primary Examiner* — Sarai Butler
(74) *Attorney, Agent, or Firm* — Moser Taboada; Joseph Pagnotta (57) ABSTRACT

A method and system for determining and updating configuration settings on a device are provided herein. In some embodiments, a method for updating configuration settings on a device may include detecting an error condition produced by executing an app on the device, collecting information associated with the error condition, the app and the device responsive to the detected error condition, sending a request for new configuration settings, wherein the request includes the collected information, receiving one or more new configuration settings in response to the request, and updating one or more configuration settings of at least one of the device or the app using the new configuration settings received.

16 Claims, 4 Drawing Sheets

METHOD AND SYSTEM FOR DETERMINING DEVICE CONFIGURATION SETTINGS

BACKGROUND OF THE INVENTION

1. Field of the Invention

Embodiments of the present invention are related to the field of computing devices and services and more specifically, directed to a method and system for determining and updating configuration settings on a device.

2. Description of the Related Art

Software application developers (e.g., app developers) today deal with heavy fragmentation across various operating system architectures. For example, heavy fragmentation exists within the ANDROID™ ecosystem. There are hundreds of different devices in the market today, and each comes with its own feature set, i.e., drivers, screen resolution, volume controls, voice parameters, camera resolution, gain, and the like.

During testing, a company might decide to configure and test for a specific number of devices (e.g., the top 10 most popular devices at the time). That is, the app software code would account for the different parameters for those devices (e.g., by assigning specific values to appropriate variables) and should theoretically work with those devices. For other devices, there might be default settings in the code that may or may not work correctly. Also, devices that come out after code release would potentially not be covered, and may not work with, the default settings or assigned values.

Operating system developers have attempted to address this issue by developing an abstraction layer that allows app software developers to access features of the devices. However, the documentation is ambiguous and subject to interpretation as between app developers and device manufacturers, and fails to adequately normalize for differences between devices.

Thus, there is a need for a method and system to handle app errors, and automatically determine and update configuration settings on a device without the app developer having to configure for each device manually.

SUMMARY OF THE INVENTION

A method and system for determining and updating configuration settings on a device are provided herein. In some embodiments, a method for updating configuration settings on a device may include detecting an error condition produced by executing an app on the device, collecting information associated with the error condition, the app and the device responsive to the detected error condition, sending a request for new configuration settings, wherein the request includes the collected information, receiving one or more new configuration settings in response to the request, and updating one or more configuration settings of at least one of the device or the app using the new configuration settings received.

In some embodiments, a method for determining configuration settings of a device may include receiving a request for configuration settings for a first device, wherein the request includes information associated with at least one of the first device, an app running on the first device, or an error condition that occurred on the first device executing the app, determining configuration settings for the device using configuration settings of other devices having at least one of (a) a same manufacturer and model number as the first device, or (b) a high affinity score indicating a level of similarity between the first device and another device, and sending the determined configuration settings.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention include a method and system for handling and resolving application errors on various computing devices, and determining, maintaining, and configuring app and device settings that perform correctly together.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
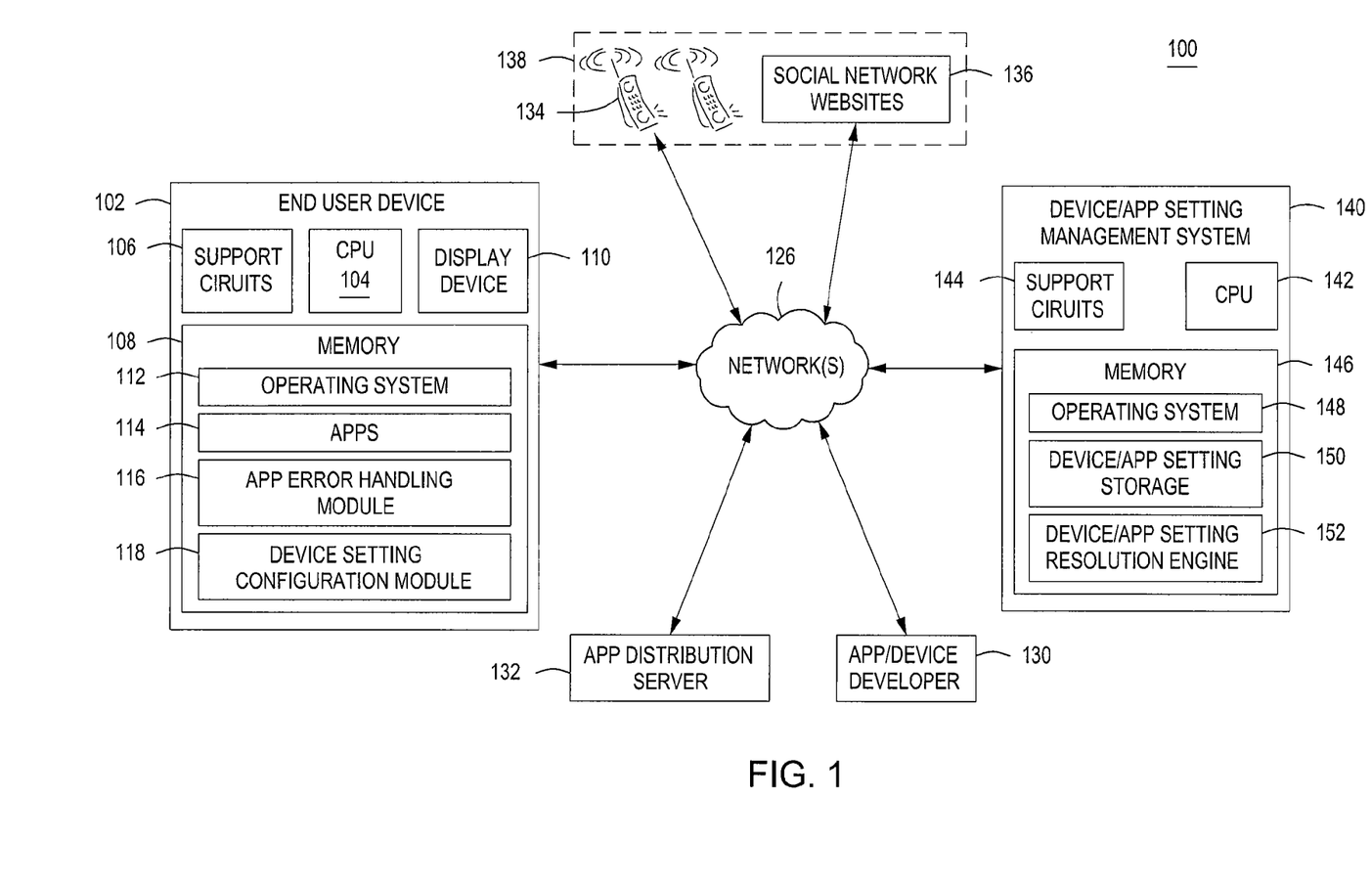
FIG. 1 depicts a block diagram of a system for handling and resolving application errors on various computing devices, and maintaining and determining app and device settings that perform correctly together, in accordance with embodiments consistent with the present application.

FIG. 1 depicts a block diagram of a system 100 that includes an end user device 102 with one or more applications (apps) 114 stored thereon, a device setting management system 140, app and/or device developers 130, an app distribution server 132, and crowd sourcing entities 138 that may include other user devices 134 and social network sites 136 (e.g., Facebook, Twitter, Cnet opinions and reviews, device/manufacturer specific message boards, and the like), communicating over one or more networks 126, according to one or more embodiments.

The end user device 102 comprises a Central Processing Unit (CPU) 104, support circuits 106, memory 108, and the display device 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 comprises at least one of Read Only Memory (ROM), Random Access Memory (RAM), disk drive storage, optical storage, removable storage and/or the like. In some embodiments, the memory 108 comprises an operating system 112, one or more apps 114 stored on and configured to run on user device 102, an app error handling module 116, and a setting configuration module 118.

The operating system (OS) 112 generally manages various computer resources (e.g., network resources, file processors, and/or the like). The operating system 112 is configured to execute operations on one or more hardware and/or software modules, such as Network Interface Cards (NICs), hard disks, virtualization layers, firewalls and/or the like. Examples of the operating system 112 may include, but are not limited to, various versions of Linux, Mac OSX, BSD, Unix, Microsoft Windows, iOS, Android and the like.

The networks 126 comprise one or more communication systems that connect computers by wire, cable, fiber optic and/or wireless link facilitated by various types of well-known network elements, such as hubs, switches, routers, and the like. The networks 126 may include an Internet Protocol (IP) network, a public switched telephone network (PSTN), or other mobile communication networks, and may employ various well-known protocols to communicate information amongst the network resources.

The device setting management system 140 comprises a CPU 142, support circuits 144, memory 146, and operating system 148 as described above with respect to end user device 102. The device setting management system 140 may further include a device/app setting storage module 150 for storing device configuration settings and app configuration settings of various types of devices, or associated pairs thereof. The device/app setting storage module 150 may include one or more databases, and the like for maintaining the settings. In some embodiments, the device setting management system 140 may further include a device/app setting resolution module 152 for determining device/app settings that function properly together, for storing device/app settings in device/app setting storage module 150 and for sending/receiving said device/app settings to/from various entities as will be described below.

An app developer 130 developing apps for a particular operating system (e.g., Android, iOS, and the like) may design apps that are configured and tested for a specific number of devices (e.g., the top 10 most popular devices at the time). That is, the app code would account for the different parameters for those devices (e.g., by assigning specific values to appropriate variables) and will work with those devices. Some parameters may work across a range of variables, with one or more optimal solutions available for that parameter on a given device. For example, a device display resolution setting of 1024×768 or 1280×800 might both work for device model X, but only 1024×768 resolution is optimal. In exemplary embodiments consistent with the present invention, the app developer may access the device setting management system to determine and obtain device settings for a particular device or group of devices they are interested in, or for settings of devices that are similar to the device or group of devices they are interested in configuring the app for. The app developer 130 may then design their app accordingly with the determined settings.

The app developer 130 may distribute the app to the public via an app distribution server 132. The app distribution server 132 may be an external entity that distributes apps for a variety of developers (e.g., APPLE® APP STORE$^{SM}$, GOOGLE® Play, and the like), or it may be an internal entity that distributes their own apps. An end user of device 102 and other users of other devices 134 may download and install the apps 114 on their respective devices.

When the app 114 doesn't work correctly on a given device (e.g., end user device 102), the app 114 may throw an exception or otherwise indicate that an error has occurred on user device 102. In some embodiments, the app error handling module 116 may collect information associated with the error and send that information to the device setting management system 140 via network 126. For example, a video app playing a video on user device 102 may cause an error or otherwise crash. The app error handling module 116 may determine that the video app completely crashed (i.e., failed to execute or ungracefully terminated) or that the video may only display a black screen. In some embodiments, the app may indicate, or the app error handling module 116 may determine, that the app may be performing at sub-optimal or degraded levels even if the app has not crashed. The information collected by the app error handling module 116 may include the device manufacturer and model, other apps or software running, the operating system version, the error exception the occurred, device settings at the time of crash, and the like.

In some embodiments, once the error or sub-optimal performance has been reported by user device 102 to the device setting management system 140, device/app setting resolution engine 152 may determine whether other devices of the same or similar manufacturers/models have been behaving correctly and may determine the optimal, or otherwise functional, configuration settings for user device 102 based on that determination. In some embodiments, the device/app setting resolution engine 152 may query the device/app setting storage 150 for the information. In some embodiments, if configuration settings for a particular device or for similar devices are not stored in device/app setting storage 150, the device/app setting resolution engine 152 may obtain the information by actively searching other user devices 134 or social networks sites 136 for configuration information of the device in question, or of similar devices. The device/app setting resolution engine 152 would then push (i.e., send) the determined configuration settings back to the non-functioning user device 102. After receiving the new determined configuration settings, the user device 102 may update existing configuration settings of at least one of the device or the app using the new configuration settings. In some embodiments, the user device 102, or a user thereof, may test the new configuration settings by running the app the caused the error condition to determine of the app runs properly using the new configuration settings.

In some embodiments, if configuration settings for a specific device cannot be found in device/app setting storage 150, or otherwise be determined by device/app setting resolution engine 152 as described above, then the device/app setting resolution engine 152 may determine appropriate configuration settings from devices having the same manufacturer with different model numbers, or devices of other manufactures that may be similar to the specific device in question.

As discussed above, in some embodiments, the device/app setting resolution engine 152 may actively seek the desired information from various crowd sourcing entities 138. In some embodiments, devices 102, 134 would be configured to automatically send/report correctly functioning device and app configuration settings, performance metrics, and the like, to the device setting management system 140 to be stored in device/app setting storage 150. In some embodiments, devices 102, 134 may be configured to send such information periodically, upon running an installed app, or manually by the user. In some embodiments, the installed apps 114 may be configured to report device/app settings to the device setting management system 140 when functioning properly on a give device. Although shown as a separate entity, in some embodiments, the device setting management system 140 may be maintained by the app developer or by the device manufacturer, or a group of one or more of each.

In some embodiments, an affinity score between different models may be calculated by the device/app setting resolution engine 152 that indicates a level of similarity between devices. For example, although device setting management system 140 may not have any information regarding device X, it may have information regarding device Y. The device setting management system 140 may calculate a score based on the similarity of various features of the devices includes the operating system level, the device manufacturer, model version, the size of the screen, device component manufacturers (e.g., if the screen or camera provider included on the devices the same), and the like.

Exemplary embodiments of the present invention may also be implemented in a testing configuration for testing alternative device and app settings. For example, devices bearing the same or similar models may be used to "test" alternative settings. Specifically, for most parameters (e.g., screen resolution), there are a finite number of settings to try, one (or more) of which will be correct, or at least acceptable. Thus, one or more alternative settings may be pushed to different devices, with performance metrics to be reported back to the device setting management system 140. Once a correct configuration is determined, it can be pushed to all devices of the relevant model.

Figure 2:
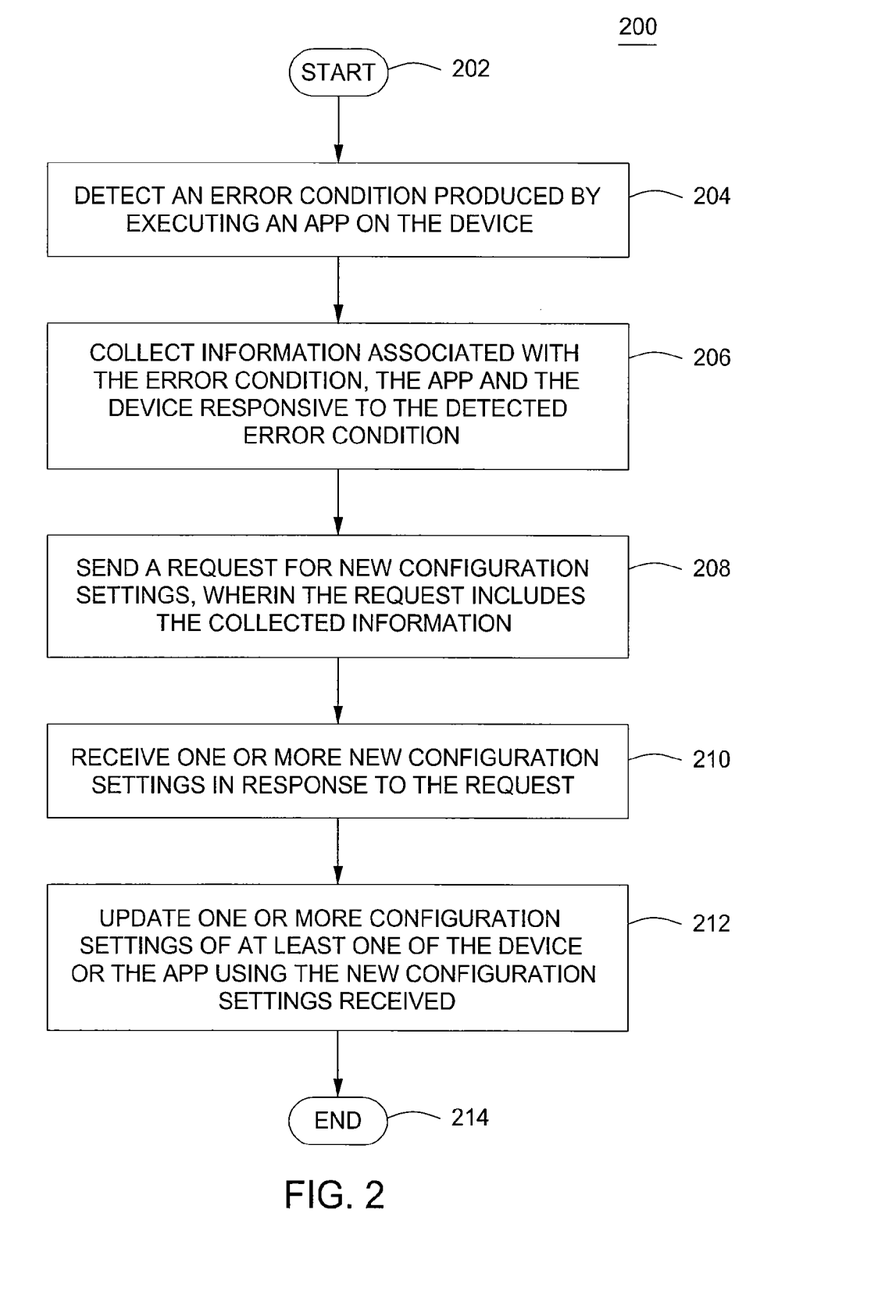
FIG. 2 depicts a flow diagram of a method for updating configuration settings on a device, according to one or more embodiments of the invention.

A method 200 in accordance with the subject invention is illustrated in FIG. 2 which depicts a flowchart having a series of steps for updating configuration settings on a device. In detail, the method 200 starts at 202 and proceeds to 204 where an error condition produced by executing an app on the device is detected. At 206, information associated with the error condition, the app and the device is collected responsive to the detected error condition. At 208, a request for new configuration settings is sent, for example to device setting management system 140, wherein the request includes the collected information. At 210, one or more new configuration settings are received by device setting management system 140 in response to the request one or more communication parameters. Finally, at 212, the one or more configuration settings of at least one of the device or the app is updated using the new configuration settings received. The method 200 ends at 214.

Figure 3:
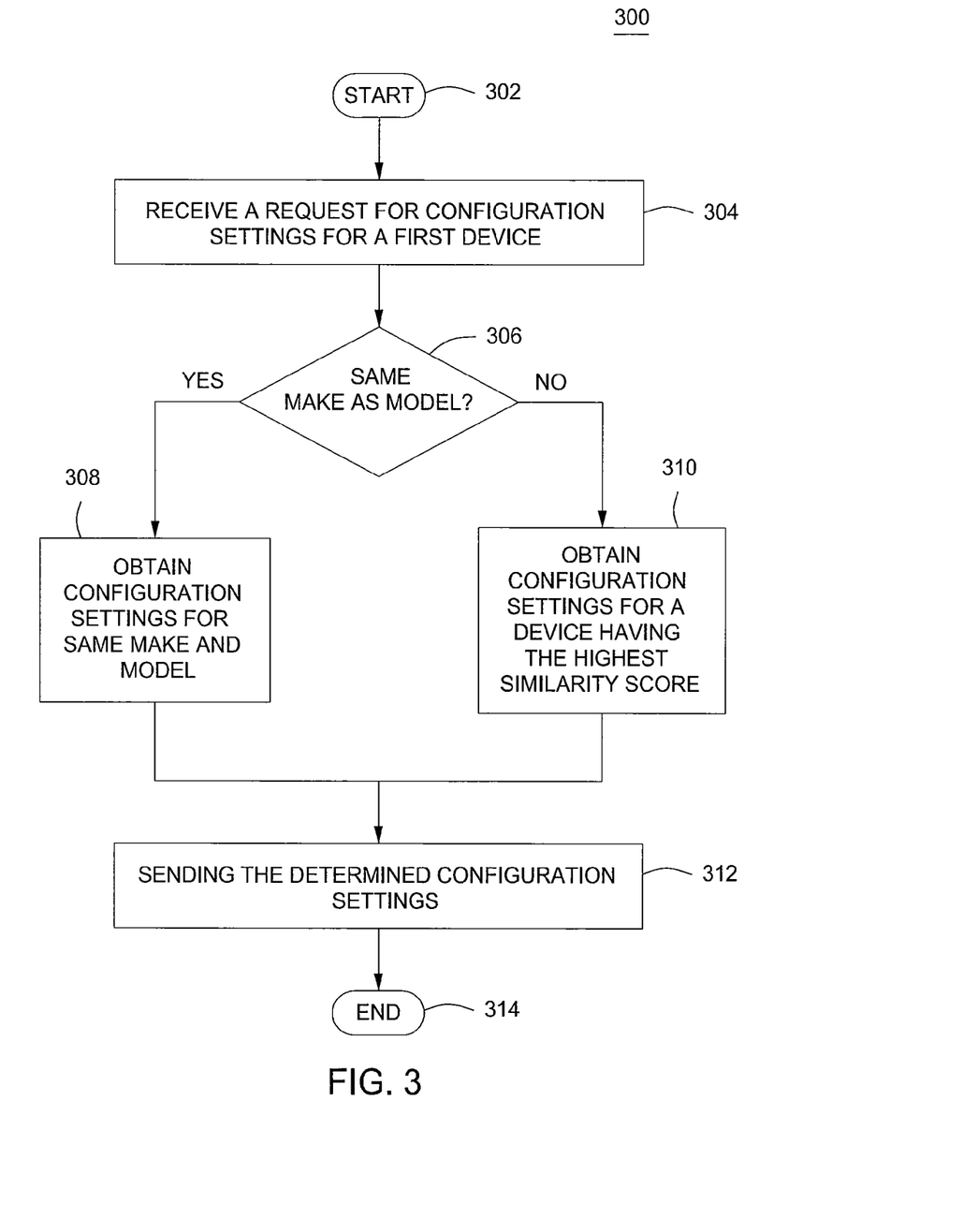
FIG. 3 depicts a flow diagram of a method for determining configuration settings of a device, according to one or more embodiments of the invention.

A method 300 in accordance with the subject invention is illustrated in FIG. 3 which depicts a flowchart having a series of steps for determining configuration settings of a device. In detail, the method 300 starts at 302 and proceeds to 304 where a request for configuration settings is received, for example, by device setting management system 140. At 306, a determination is made as to whether the device setting management system 140 contains, or otherwise able to obtain, configuration settings for the specific make and model of the first device. If so, the method proceeds to 308. At 308, configuration settings for same make and model are obtained and, at 312, sent to the first device. If at 306 a determination is made that the device setting management system 140 does not contain, or is otherwise able to obtain, configuration settings for the specific make and model of the first device, the method proceeds to 310. At 310, configuration settings for a device having the highest similarity score are obtained, and, at 312, sent to the first device. The method 300 ends at 314. A similarity score as between two devices may be determined in various ways, including through manual entry; proximity or similarity of the model numbers; proximity in release dates of the devices; operating systems; and similarity between known parameters of the devices. This list is non-exhaustive and used for illustrative purposes only.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 4:
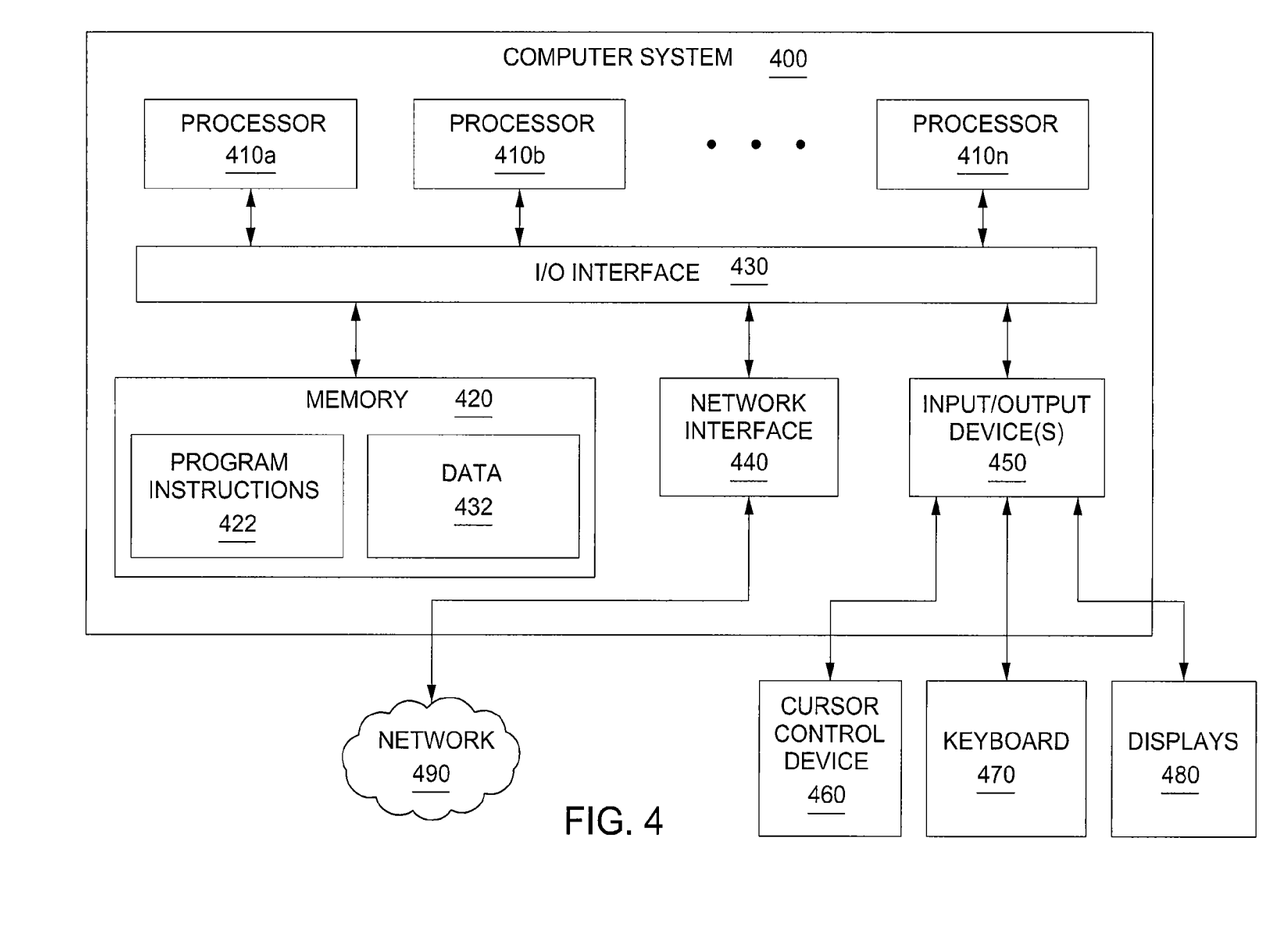
FIG. 4 is a detailed block diagram of a computer system, according to one or more embodiments.

FIG. 4 depicts a computer system 400 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method for updating configuration settings on a device comprising:
    detecting an error condition produced by executing an app on the device;
    collecting information associated with at least one of the error condition, the app, and the device;
    sending a request for new configuration settings, wherein the request includes the collected information;
    receiving one or more new configuration settings in response to the request, wherein the one or more new configuration settings received were determined based on:
        (i) configuration settings used for other devices having a same manufacturer and model number when said configuration settings exist, and
        (ii) configuration settings used for other devices having similar manufacturer or model number as the device that produced the error condition when configuration settings used for other devices having a same manufacturer and model number do not exist; and
    updating existing configuration settings of at least one of the device or the app using the new configuration settings received.

2. The method of claim 1, wherein the existing device configuration settings includes at least one of a version level of an operating system on the device, a device manufacturer, a device model, other apps or software running at a time the error condition was detected, or an error condition that occurred, or existing device settings at a time the error condition was detected.

3. The method of claim 1, wherein detecting the error condition produced by executing an app on the device includes determining that the app is performing at sub-optimal or degraded levels.

4. The method of claim 1, wherein after updating existing configuration settings of at least one of the device or the app using the new configuration settings received, the method further comprises:
    executing the app using the new configuration settings of the at least one of the device or the app; and
    determining if the app is executing correctly.

5. A method for determining configuration settings of a device comprising:
    receiving a request for configuration settings for a first device, wherein the request includes information associated with at least one of the first device, an app running on the first device, or an error condition that occurred on the first device executing the app;

determining configuration settings for the first device using configuration settings of other devices, using (a) a manufacturer and model number as the first device when another device having a same manufacturer and model number as the first device exists, and (b) an affinity score indicating a level of similarity between the first device and another device when another device having a same manufacturer and model number as the first device does not exist; and sending the determined configuration settings.

6. The method of claim 5, wherein determining configuration settings for the first device includes actively searching for and polling other devices for configuration information, wherein the other devices polled are of a same or similar make or model of the first device.

7. The method of claim 5, wherein determining configuration settings for the first device includes actively searching for configuration information about the first device on social networking Websites.

8. The method of claim 5, wherein determining configuration settings for the first device includes searching a database containing at least one of device configuration settings, app configuration settings, or associated pairs of device configuration settings and app configuration settings.

9. The method of claim 8, wherein the device and app configuration settings stored in the database are received from a plurality of external sources that periodically send properly functioning configuration settings of various devices.

10. The method of claim 8, wherein the affinity score between different models is determined by a device setting resolution engine using the device and app configuration settings stored in the database.

11. The method of claim 5, wherein the affinity score is determined based on a similarity of one or more features of the first device and other device, the one or more features including at least one or operating system level, device manufacturer, device model version, screen size, proximity in release dates of the devices, device component manufacturer, or by manual entry.

12. The method of claim 5, wherein prior to sending the determined configuration settings, the method further comprising:

testing the determined configuration settings on devices having a same or similar make and model of the first device to verify that the determined configuration settings function properly.

13. An apparatus for updating configuration settings on a device comprising:
a) at least one processor;
b) at least one input device; and
c) at least one storage device storing processor-executable instructions which, when executed by the at least one processor, performs a method including:
1) detecting an error condition produced by executing an app on the device;
2) collecting information associated with at least one of the error condition, the app, and the device;
3) sending a request for new configuration settings, wherein the request includes the collected information;
4) receiving one or more new configuration settings in response to the request, wherein the one or more new configuration settings received were determined based on:
(i) configuration settings used for other devices having a same manufacturer and model number when said configuration settings exist, and
(ii) configuration settings used for other devices having similar manufacturer or model number as the device that produced the error condition when configuration settings used for other devices having a same manufacturer and model number do not exist; and
5) updating existing configuration settings of at least one of the device or the app using the new configuration settings received.

14. The apparatus of claim 13, wherein the existing configuration settings includes at least one of a version level of an operating system on the device, a device manufacturer, a device model, other apps or software running at a time the error condition was detected, or an error condition that occurred, or existing device settings at a time the error condition was detected.

15. The apparatus of claim 13, wherein detecting the error condition produced by executing an app on the device includes determining that the app is performing at sub-optimal or degraded levels.

16. The apparatus of claim 13, wherein after updating existing configuration settings of at least one of the device or the app using the new configuration settings received, the method further comprises:

executing the app using the new configuration settings of the at least one of the device or the app; and determining if the app is executing correctly.

* * * * *